US010685030B2

(12) United States Patent
Brainerd et al.

(10) Patent No.: US 10,685,030 B2
(45) Date of Patent: *Jun. 16, 2020

(54) GRAPHIC REPRESENTATIONS OF DATA RELATIONSHIPS

(71) Applicant: Ab Initio Technology LLC, Lexington, MA (US)

(72) Inventors: Jeffrey Brainerd, Jamaica Plain, MA (US); Alan Morse, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/908,980

(22) Filed: Mar. 1, 2018

(65) Prior Publication Data

US 2018/0189361 A1   Jul. 5, 2018

Related U.S. Application Data

(63) Continuation of application No. 15/378,322, filed on Dec. 14, 2016, now Pat. No. 9,910,901, which is a
(Continued)

(51) Int. Cl.
*G06F 16/248* (2019.01)
*G06F 16/13* (2019.01)
(Continued)

(52) U.S. Cl.
CPC .......... *G06F 16/248* (2019.01); *G06F 16/13* (2019.01); *G06F 16/2425* (2019.01); *G06F 16/2455* (2019.01); *G06F 16/904* (2019.01)

(58) Field of Classification Search
CPC ......... G06F 17/30554; G06F 17/30864; G06F 3/0481; G06F 17/30572; G06F 3/04842
(Continued)

(56) References Cited

U.S. PATENT DOCUMENTS

| 5,596,746 A | 1/1997 | Shen et al. |
| 5,701,453 A | 12/1997 | Maloney et al. |

(Continued)

FOREIGN PATENT DOCUMENTS

| JP | 030294926 | 12/1991 |
| JP | 2003067186 | 3/2003 |

(Continued)

OTHER PUBLICATIONS

Rajendra Bose et al. "a Conceptual Framework for Composing and Managing Scientific metadata Lineage".*

(Continued)

*Primary Examiner* — Hung T Vy
(74) *Attorney, Agent, or Firm* — Occhiuti & Rohlicek LLP

(57) ABSTRACT

Presenting a diagram indicating relationships among data items stored in a data management system includes: receiving a request that identifies a first data item stored in the data management system from a user interface; retrieving stored configuration information that includes a plurality of selection specifications for selecting data items in the data management system that are related to a given data item of a predetermined type, where each selection specification is associated with a different respective predetermined type; querying the data management system to identify a set of one or more data items according to a selection specification from the configuration information that is associated with a type of the first data item; for each of multiple returned data items in the identified set, querying the data management system to determine whether additional data items are identified according to a selection specification from the configuration information that is associated with a type of the returned data item; generating a diagram indicating relationships among data items identified using the configuration information; and presenting the generated diagram over the user interface.

34 Claims, 10 Drawing Sheets

Related U.S. Application Data continuation of application No. 12/393,765, filed on Feb. 26, 2009, now Pat. No. 9,760,612.

(60) Provisional application No. 61/031,672, filed on Feb. 26, 2008.

(51) Int. Cl.
  *G06F 16/904* (2019.01)
  *G06F 16/242* (2019.01)
  *G06F 16/2455* (2019.01)

(58) Field of Classification Search
  USPC ............... 707/706, 722, 758, 759; 715/853; 709/224, 220, 225
  See application file for complete search history.

(56) References Cited

U.S. PATENT DOCUMENTS

| | | | |
|---|---|---|---|
| 5,734,886 A | 3/1998 | Grosse et al. | |
| 5,809,296 A | 9/1998 | Yong et al. | |
| 6,346,945 B1 | 2/2002 | Mansurov et al. | |
| 6,609,132 B1 | 8/2003 | White et al. | |
| 6,718,319 B1 * | 4/2004 | Fisher, Jr. | G06Q 20/3552 |
| 7,599,947 B1 | 10/2009 | Tolbert et al. | |
| 7,734,619 B2 | 6/2010 | Vierich et al. | |
| 7,899,833 B2 | 3/2011 | Stevens et al. | |
| 8,407,262 B2 | 3/2013 | Hsu et al. | |
| 2005/0257193 A1 | 11/2005 | Falk et al. | |
| 2006/0095466 A1 * | 5/2006 | Stevens | G06F 17/30398 |
| 2007/0214179 A1 * | 9/2007 | Hoang | G06F 17/30398 |

FOREIGN PATENT DOCUMENTS

| | | |
|---|---|---|
| JP | 2008524671 | 7/2008 |
| WO | 20020011344 | 2/2002 |
| WO | 20060050342 | 5/2006 |

OTHER PUBLICATIONS

U.S. Appl. No. 15/378,322, filed Dec. 14, 2016.
U.S. Appl. No. 12/393,765, filed Feb. 26, 2009.
Rajendra Bose et al. ("a conceptual Framework for Composing and Managing Scientific metadata Lineage"(Proceedings of the 14th international Conference on Scientific and Statistical Metadatabase Management, pp. 1-5, 2002).

* cited by examiner

'Subject Area' :
    {'sel_spec':['inv_walk("SubjectAreaOID", "Logical Entity")']}, 'Logical Entity' :
    {'sel_spec':[r"""inv_walk("Parent_EntityOID","Entity Relationship").filter(r"look_ahead("walk('Child_EntityOID','Logical Entity').walk('SubjectAreaOID','Subject Area').eval('ann.display_name == \"%s\"')")""" % bds.obj_display_name]}, 'Entity Relationship' :
    {'sel_spec':['walk("Child_EntityOID","Logical Entity")'],
    'label_spec':'eval("ann.Parent_To_Child_Phrase")'}

FIG. 7A

Downstream

'System' :
 {'walk_descriptor': [
  'inv_walk("SystemOID","dataset").inv_walk("DatasetsReadOID", "Executable")\
   .walk("DatasetsWrittenOID", "dataset").walk("SystemOID", "System")']}

- 
- 
-

Upstream

'System' :
 {'walk_descriptor':[
 'inv_walk("SystemOID","dataset").inv_walk("DatasetsWrittenOID","Executable")\
  .walk("DatasetsReadOID", "dataset").walk("SystemOID", "System")']}

GRAPHIC REPRESENTATIONS OF DATA RELATIONSHIPS

CLAIM OF PRIORITY

This application is a continuation of U.S. patent application Ser. No. 15/378,322, filed on Dec. 14, 2016, which is a continuation of U.S. patent application Ser. No. 12/393,765, filed on Feb. 26, 2009, which claims priority under 35 USC § 119(e) to U.S. Patent Application Ser. No. 61/031,672, filed on Feb. 26, 2008, each of which is incorporated herein by reference.

BACKGROUND

This description relates to graphic representations of data relationships.

Enterprises may use various complex data processing systems, such as data warehousing, customer relationship management, and data mining, to manage data. In many data processing systems, data are pulled from many different data sources, such as database files, operational systems, flat files, the internet, etc., into a central repository. Often, data are transformed before being loaded in the system. Transformation may include cleansing, integration, and extraction. To keep track of the transformations that have happened to the data stored in a system, metadata can be used. Metadata are data that describe other data's origins, histories, inter-relationships, etc. In some systems, a user interface is provided to manage metadata. Stored data items that include metadata or otherwise represent or refer to data that has been (or will be) stored in or processed by the system can be accessed using object-oriented, relational, or other techniques and structures for managing stored data. For example, a data item including metadata can include information about a table, file, or other dataset, or an application or data processing element that generates a dataset.

SUMMARY

In one aspect, in general, a method for presenting a diagram indicating relationships among data items stored in a data management system includes: receiving a request that identifies a first data item stored in the data management system from a user interface; retrieving stored configuration information that includes a plurality of selection specifications for selecting data items in the data management system that are related to a given data item of a predetermined type, where each selection specification is associated with a different respective predetermined type; querying the data management system to identify a set of one or more data items according to a selection specification from the configuration information that is associated with a type of the first data item; for each of multiple returned data items in the identified set, querying the data management system to determine whether additional data items are identified according to a selection specification from the configuration information that is associated with a type of the returned data item; generating a diagram indicating relationships among data items identified using the configuration information; and presenting the generated diagram over the user interface.

Aspects can include one or more of the following features.

Querying the data management system to identify the set of one or more data items according to the selection specification includes dynamically formulating a query using the selection specification in response to the request, processing the query by the data management system, and receiving a query result from the data management system identifying the set of one or more data items.

The query includes at least one navigation action that navigates the data management system to retrieve data items that are referenced by an attribute of the first data item.

The query includes at least one navigation action that navigates the data management system to retrieve data items that have an attribute referencing the first data item.

Processing the query by the data management system includes navigating the management system recursively and returning at least some data items found at each of multiple steps of the recursion.

Querying the data management system to determine whether additional data items are identified includes performing multiple iterations of queries, where each iteration includes determining another set of one or more data items each related to at least one data item of a previous set of one or more data items from a previous iteration.

Iterations of queries are performed until no more data items are found that are related to any of the previous sets of one or more data items.

The method further includes receiving from the user interface a selection of a configuration file including the configuration information from multiple stored configuration files.

The configuration information includes a label specification associated with the type of the first data item for constructing a label for a node of the generated diagram representing the first data item.

The configuration information includes a label specification associated with the type of the first data item for constructing a label for an edge of the generated diagram representing a relationship between the first data item and another data item.

Each predetermined type corresponds to a different portion of a dataflow graph processing system.

At least one predetermined type corresponds to a data item representing a portion of a dataflow graph that includes nodes representing processing components and links representing flows of data between the processing components.

At least one predetermined type corresponds to a data item representing a field in a dataset.

The first data item includes metadata describing stored data that corresponds to at least a portion of a dataset or an executable program.

The stored data is stored in a first data source different from the data management system, and the generated diagram includes an edge representing a data lineage relationship between a node representing the stored data and a node representing data that corresponds to at least a portion of a dataset or an executable program stored in a second data source different from the first data source and the data management system.

The generated diagram includes an edge representing a downstream data lineage relationship between a node representing the stored data and a node representing an entity affected by the stored data.

The generated diagram includes an edge representing an upstream data lineage relationship between a node representing the stored data and a node representing a source from which the stored data is derived.

In another aspect, in general, a system for presenting a diagram indicating relationships among data items stored in a data management system includes: a data management system storing data items; a user interface including an input interface configured to receive a request that identifies a first data item stored in the data management system; a storage system storing configuration information that includes a plurality of selection specifications for selecting data items in the data management system that are related to a given data item of a predetermined type, where each selection specification is associated with a different respective predetermined type; a data management system interface configured to query the data management system to identify a set of one or more data items according to a selection specification from the configuration information that is associated with a type of the first data item, and for each of multiple returned data items in the identified set, query the data management system to determine whether additional data items are identified according to a selection specification from the configuration information that is associated with a type of the returned data item; and one or more processors configured to execute a diagram generator to generate a diagram indicating relationships among data items identified using the configuration information. The user interface includes an output interface configured to present the generated diagram.

In another aspect, in general, a system for presenting a diagram indicating relationships among data items stored in a data management system includes: means for receiving a request that identifies a first data item stored in the data management system from a user interface; means for retrieving stored configuration information that includes a plurality of selection specifications for selecting data items in the data management system that are related to a given data item of a predetermined type, where each selection specification is associated with a different respective predetermined type; means for querying the data management system to identify a set of one or more data items according to a selection specification from the configuration information that is associated with a type of the first data item, and querying the data management system, for each of multiple returned data items in the identified set, to determine whether additional data items are identified according to a selection specification from the configuration information that is associated with a type of the returned data item; means for generating a diagram indicating relationships among data items identified using the configuration information; and means for presenting the generated diagram over the user interface.

In another aspect, in general, a computer-readable medium stores a computer program for presenting a diagram indicating relationships among data items stored in a data management system. The computer program including instructions for causing a computer to: receive a request that identifies a first data item stored in the data management system from a user interface; retrieve stored configuration information that includes a plurality of selection specifications for selecting data items in the data management system that are related to a given data item of a predetermined type, where each selection specification is associated with a different respective predetermined type; query the data management system to identify a set of one or more data items according to a selection specification from the configuration information that is associated with a type of the first data item; for each of multiple returned data items in the identified set, query the data management system to determine whether additional data items are identified according to a selection specification from the configuration information that is associated with a type of the returned data item; generate a diagram indicating relationships among data items identified using the configuration information; and present the generated diagram over the user interface.

Aspects can include one or more of the following advantages.

Sometimes a database user may want to investigate how certain data are derived from different data sources. For example, a database user may want to know from which source a dataset or data object is imported. Tracing a dataset back to sources from which it is derived is called upstream data lineage tracing. Sometimes a database user may want to investigate how certain datasets have been used (downstream data lineage tracing), for example, which application has read a given dataset. A database user may also be interested in knowing how a dataset is related to other datasets. For example, a user may want to know if a dataset is modified, what tables will be affected. The techniques described herein can be used to help a user find answers to a variety of data relationship queries including queries in which the relevant data span multiple distributed, heterogeneous sources.

Other features and advantages of the invention will become apparent from the following description, and from the claims.

DESCRIPTION OF DRAWINGS

FIGS. 7A and 7B are examples of configuration files.

DESCRIPTION

A user can browse, modify, or create new data items in a data processing system using a user interface. Some data items correspond to programs or program modules (e.g., source code or executable code), and some data items correspond to metadata representing programs, datasets, data sources, or collections of other data items. Various types of user interfaces can be provided for different types of users. For example, a user that develops applications for the system (a developer) may use one kind of interface, and a user that executes applications or views results of applications may use another kind of interface.

Figure 1:
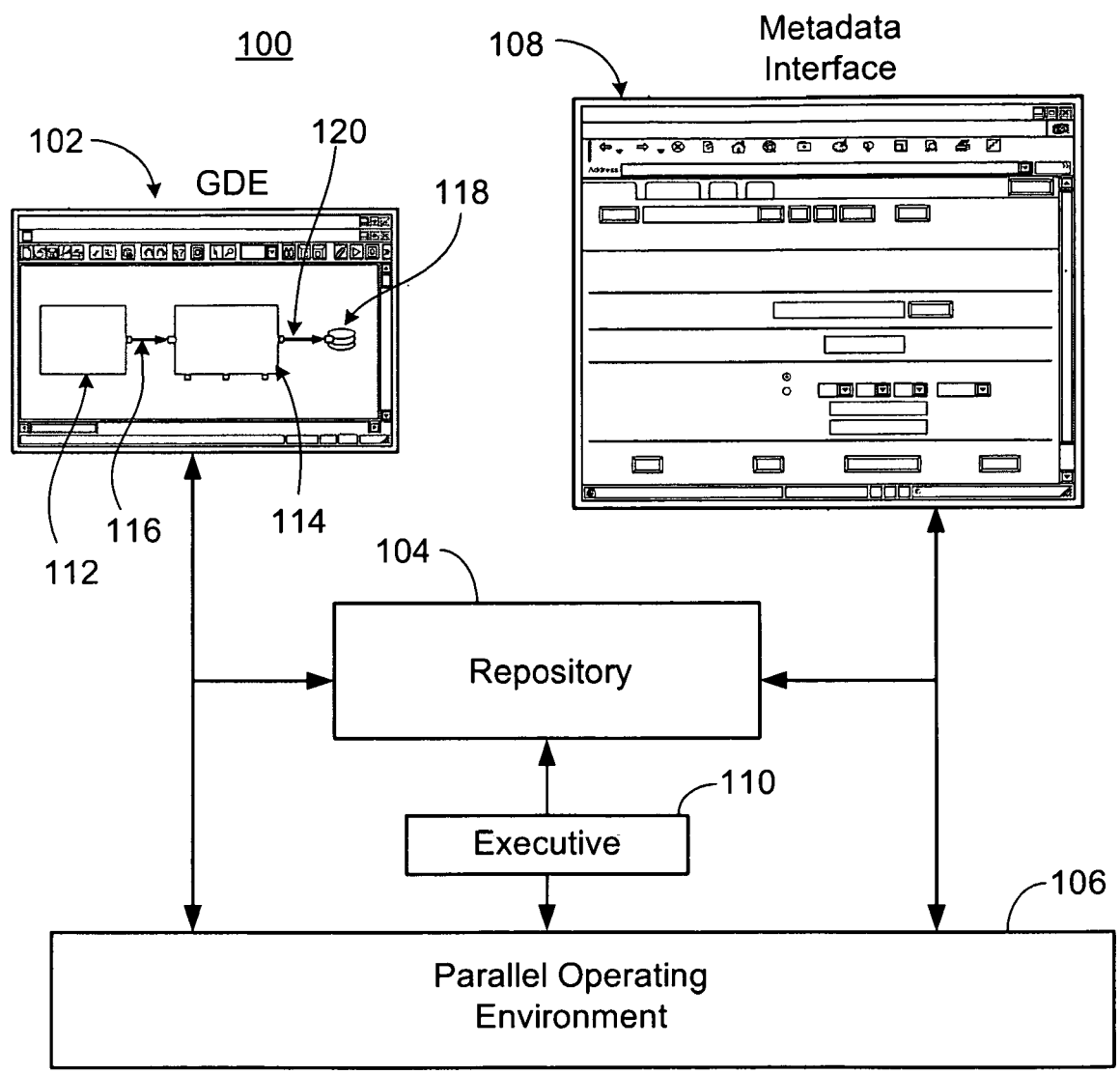
FIG. 1 is a diagram of an exemplary data processing system.

FIG. 1 shows an exemplary data processing system 100 that includes a Graphical Development Environment (GDE) 102, which is a user interface that allows users to build applications using dataflow graphs. Dataflow graphs use functional modules called components and data conduits called flows to represent data movement from one component to another. A graph-based application can thus be represented by a directed graph, with vertices in the graph representing components (either data storage components or executable computation components), and the directed links or "edges" connecting vertices in the graph representing flows of data between components. A dataflow graph (also called simply a "graph") is a modular entity. Each graph can be made up of one or more other graphs, and a particular graph can be a component in a larger graph. The GDE 102 enables developers to develop, test, and deploy applications as executable graphs that are tailored to a given user-specific environment. An exemplary dataflow graph shown in FIG. 1 being constructed using the GDE 102 includes a component 112 that generates data, a component 114 that receives data over a flow 116 and provides data to an output dataset 118 over a flow 120.

The GDE 102 communicates with a repository 104 and a parallel operating environment 106. The repository 104 is, for example, a scalable object-oriented database system designed to support the development and execution of graph-based applications and the interchange of metadata between the graph-based applications and other systems (e.g., other operating systems). The repository 104 is a storage system for all kinds of metadata, including documentation, record formats (e.g., fields and data types of records in a table), transform functions, graphs, jobs, and monitoring information, for example. The parallel operating environment 106 interprets programs represented by dataflow graphs that users have constructed in the GDE 102, generates computer instructions based on the processing logic and resources defined in the graphs, and executes those instructions on one or more processors and/or computer systems (which need not be homogeneous).

An executive 110 is an optional repository-based job scheduling system. The executive 110 maintains jobs and job queues as objects within the repository 104.

A metadata interface 108 (e.g., a web browser based interface) provides a user interface for data items stored in the repository 104 that consist of or include or reference metadata. Through the metadata interface 108, a user can access the repository 104 to browse existing data items, alter existing data items, create new data items, and specify application parameters. Some of the data items represent dataflow graphs or other executable programs, datasets that provide sources for graphs or store results of graphs, or information about developers of the graphs, for example. The metadata interface 108 also provides a user an interface to view and manipulate jobs and job queues in the executive 110. Through the metadata interface 108, a user can specify values of the runtime parameters for a data flow graph to allow the executive 110 to run the job generated from the data flow graph.

U.S. application Ser. No. 10/979,742, entitled "Managing Related Data Objects," incorporated herein by reference, discloses techniques of managing and providing an interface to related data items. The techniques disclosed there give a user the capability of defining a view to be presented on a web browser. Such a view allows the user to access desired information contained in and/or associated with data items. Each view is associated with a type of data item and includes one or more "view-elements" that define the data to be rendered. Each view-element includes an element-descriptor that enables retrieval of data items in the category associated with the view.

Figure 2:
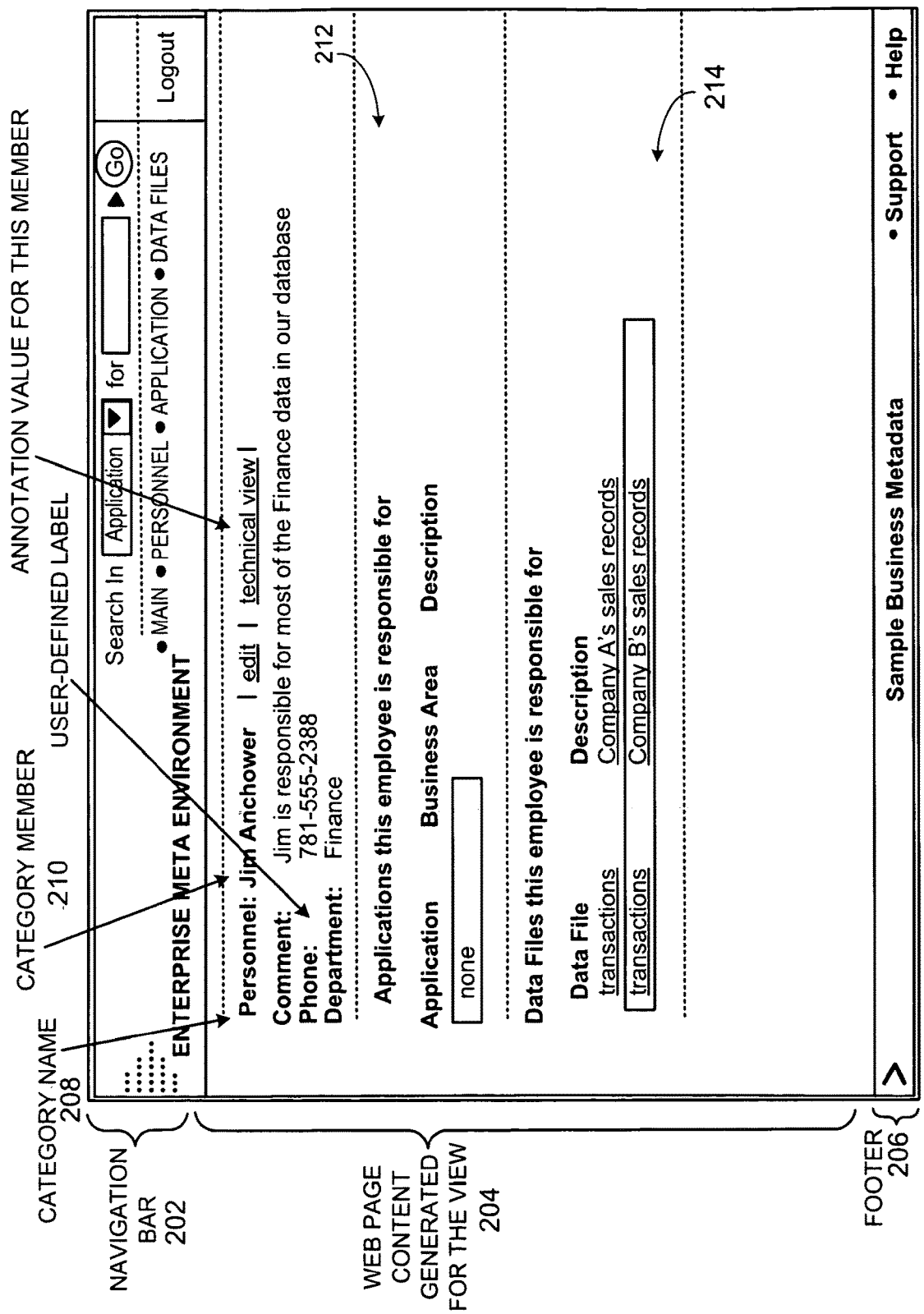
FIG. 2 is an example of a web user interface for data browsing.

FIG. 2 shows an example of a view presented in a web browser. The view includes a navigation bar 202, a content section 204, and a footer 206. The content section 204 is displayed according to the view defined by the user. In this case, the view includes four view-elements: a category name 208 (e.g., Personnel), the name of a category member 210 (e.g., Jim Anchower), a view element 212 that shows the applications this employee is responsible for, and a view-element 214 that shows the data files that this employee is responsible for.

When a user is interested in knowing the history of a data item and its relationship with other data items in the repository 104, he can seek the desired information through a manual process. He can use the interface 108 to browse linked data items sequentially. Alternatively, the user can use a programming language to query the database. In both approaches, in order to extract the historical information, the user may need to send a first query, wait for the query result, extract the field information in the query result, send a second query based on the extracted field information. This step-by-step manual process may become tedious if a user is interested in the history of a data item that has a long data lineage or is interested in the relationship of a data object that is deeply embedded.

It is advantageous to allow a user to pose ad-hoc queries related to data lineage, for example, or other type of data relationship and to allow a user to retrieve data relationship information in a dynamic and user configurable manner. It is also advantageous to present query results in diagrams.

Figure 3:
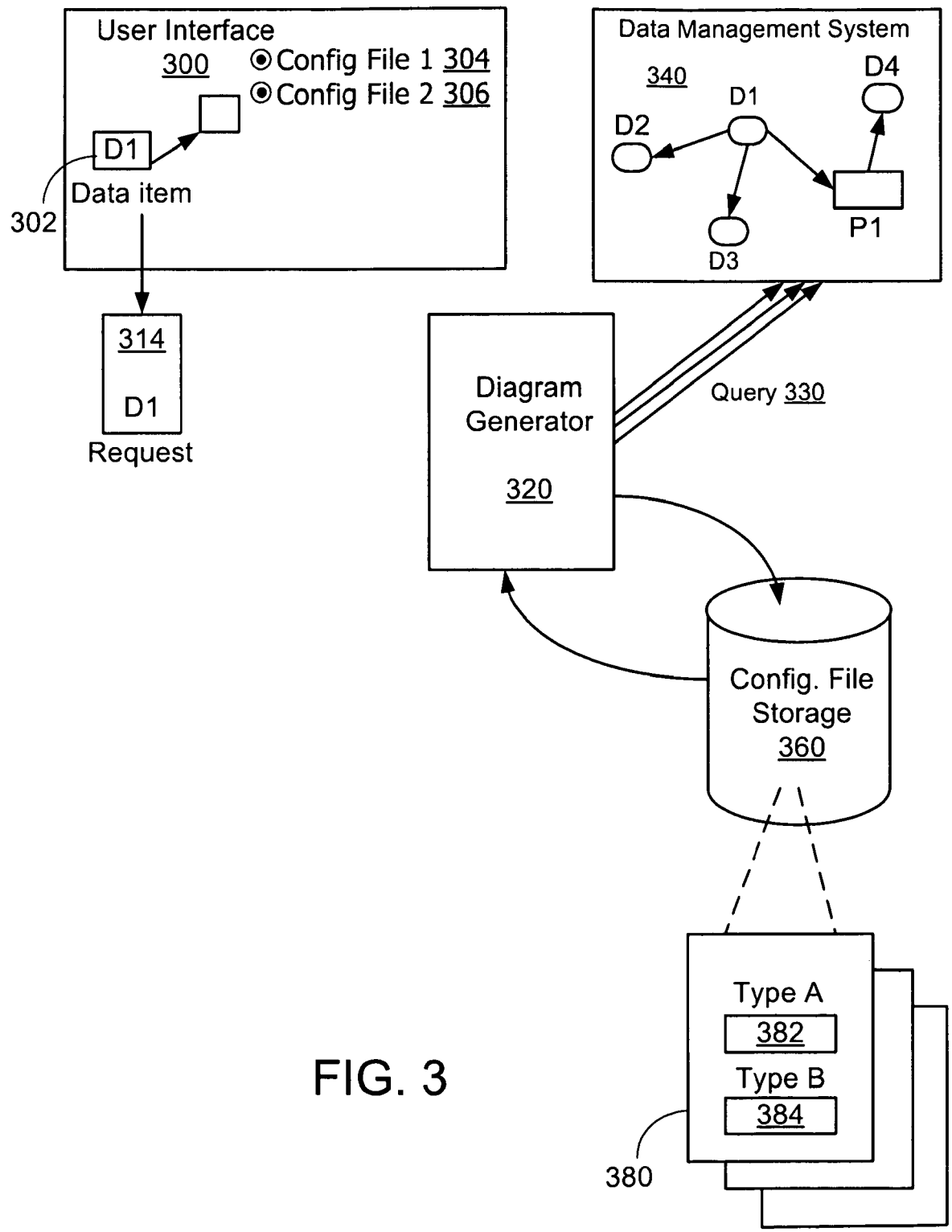
FIG. 3 is a schematic diagram illustrating a process of generating data relationship diagrams.

Referring to FIG. 3, in an exemplary implementation of another approach to extracting desired information, a user initiates a data relationship diagram generating process by selecting a data item 302 presented on a user interface 300 (e.g., an interface such as the GDE 102 or the metadata interface 108). A diagram generator 320 (e.g., an application running on the operating system 106) interacts with a data management system 340 (e.g., a database implemented in the repository 104) using a data management system interface (e.g., a communication port to for sending queries and receiving responses) to retrieve data items related to the selected data item 302 and automatically generate a data relationship diagram for presentation to the user on the user interface 300. The selected data item 302 is labeled as D1 in FIG. 3. The user uses input interfaces (e.g., buttons, menus, etc.) to select a type of data relationship diagram that he is interested in, data lineage for example, and optionally any associated information such as upstream (e.g., how this data item is derived from, or used to receive input data from, a source) and/or downstream (e.g., how this data item is received by, or used to generate output data for, an affected entity), indicating whether the data relationship diagram is to show relationships for data items upstream, downstream, or both, from the selected starting data item. A request 314 is made to the diagram generator 320 with an indication of the selected data item D1 passed as an argument. The data item D1 is used as the starting point for generating the diagram to be presented to the user using an output interface (e.g., a window on a screen).

The diagram generator 320 receives the request 314 and searches in the configuration file storage 360 for a configuration file that corresponds to the request 314. A typical configuration file 380 contains one or more selection specifications, 382, 384, etc., each associated with a corresponding predetermined data item type. For example, each data item type can correspond to a different portion of a dataflow graph processing environment. Some data item types can correspond to data items that represent graphs. Some data item types can correspond to data items that represent components within graphs. Some data item types can correspond to data items that represent datasets. Some data item types can correspond to data items that represent fields within datasets.

A selection specification specifies a selection action or a series of selection actions to navigate among and select data items stored in the data management system 340. A selection action can include, for example, a navigation action that indicates how to navigate from one data item to the next, or another type of action that determines which data items will be returned by performing functions such as filtering. In the configuration file 380, each type of data item is associated with a selection specification. For example, the selection specification 382 is associated with type A, and the selection specification 384 is associated with type B. A type of a data item may be specified, for example, according to a database schema that defines attributes (or "fields" or "columns") and relationships among those attributes (e.g., represented by an entity-relationship diagram).

The diagram generator 320 retrieves the configuration file 380 corresponding to the request 314 from the configuration file storage 360, and uses the configuration file to issue a query 330 to the data management system 340.

A series of multiple query interactions between the diagram generator 320 and the data management system 340 may happen. The diagram generator 320 uses D1 as the starting point for a first query for navigating the data management system 340 based on the selection specification associated with the type of D1 and receives a query result that may include one or more additional data items. For example, if the type of D1 is type B, the diagram generator 320 selects the selection specification 384 and formulates a query that includes the series of selection actions contained in the selection specification 384. The query is formulated, for example, in terms of a query language that the data management system 340 is able to interpret. With each query, a set of one or more data items may be retrieved. In some cases, a query may not return any data items.

Illustrated in FIG. 3 as an example, the data management system 340, starting with D1, retrieves a set of one or more data items using the selection specification 384. The selection specifications specify the kinds of relationships (e.g., primary key/foreign key relationships) are to be navigated in the data management system 340 to retrieve the set of data items. In this example, the retrieved set of data items contains D2, D3, and P1 and is returned to the diagram generator. The data items D2 and D3 are of the same type as D1, type B. The data item P1 is of a different type, type A.

For each data item in the retrieved set of data items, the diagram generator 320 looks up the selection specification associated with the type of that data item and sends a query to the data management system 340 to retrieve another set of data items by following the selection actions in the selection specification associated with that type. The selection specification for D2 and D3 is the selection specification 384 because D2 and D3 are of the same type as D1. The selection specification for P1 is the selection specification 382 because P1 is of type A with which the selection specification 382 is associated. The data management system attempts to retrieve a new set of one or more data items for each data item in the retrieved set, so for the first set of D2, D3, and P1, the data management system can potentially retrieve three new sets of one or more data items using the selection specification 384 for D2 and D3 and the selection specification 382 for P1. In some cases, the attempt to retrieve a new set of data items results in no data items being found. For each data item contained in each new set of one or more data items retrieved for D2, D3, or P1 that are returned to the diagram generator 320, the diagram generator 320 finds the selection specification for the type of that data item and sends out a new query to the data management system 340. The data management system 340 then carries out the selection actions in the specification and attempts to retrieve another set of one or more data items to the diagram generator.

Figure 4A:
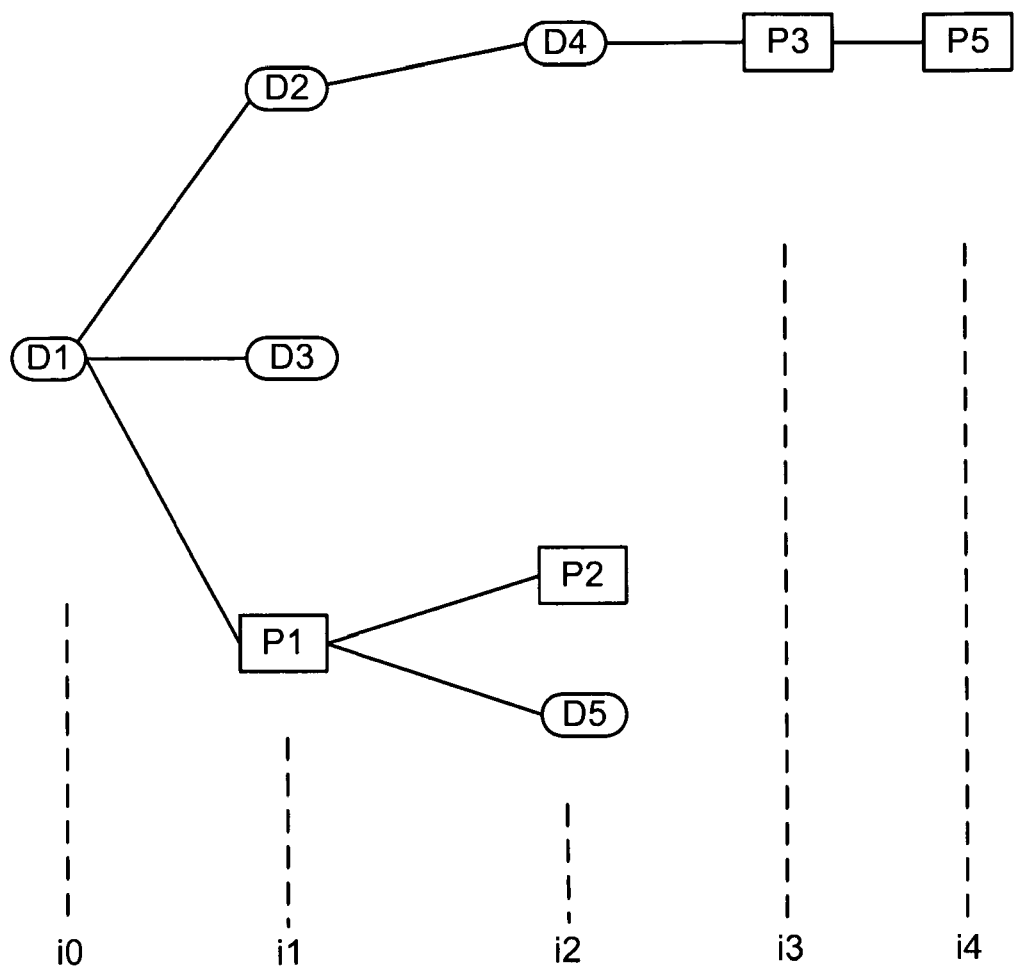
FIG. 4A shows an exemplary data relationship diagram.
Figure 4B:
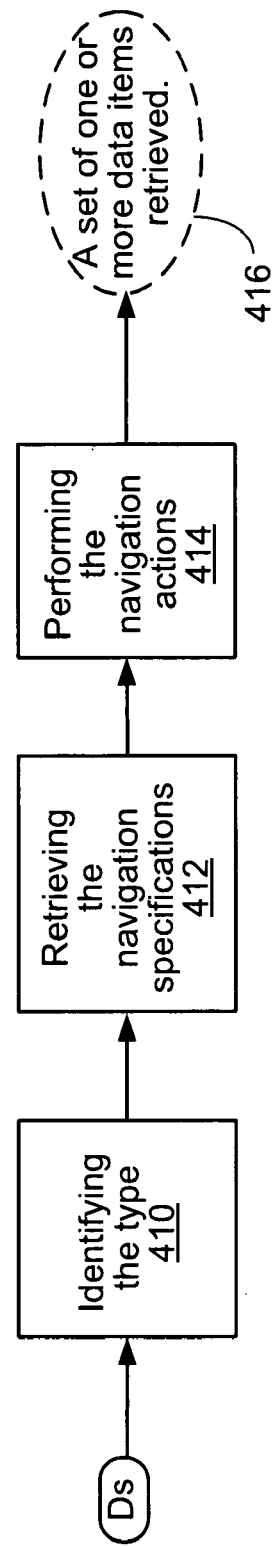
FIG. 4B is a flowchart of a process for retrieving data items.

FIGS. 4A and 4B further illustrate this looping process. FIG. 4A shows the sets of data items retrieved in each iteration of this process, and the relationship links that were traversed to reach those data items. D1 is the starting data item (iteration i0). From D1, the set of data items retrieved contains D2, D3, and P1 (iteration i1). From D2, the set of one or more data items retrieved contains only one data item D4. From D3, zero data items are retrieved. From P1, the set of one or more data items retrieved contains two data items, P2 and D5. So in the next iteration (i2) three data items were retrieved. From D4, the set of one more data items retrieved contains P3 (iteration i3). From P3, the set of data items retrieved contains P5 (iteration i4). Zero data items are retrieved from P2, D5, and P5.

FIG. 4B shows a flowchart for an exemplary process for retrieving the data items. Starting with the data item Ds, the type of Ds is identified in step 410. The selection specification associated with the type of Ds is determined in step 412. The selection actions defined in the selection specification are performed in step 414, potentially resulting in a set of one or more data items being retrieved (step 416). The process terminates when no more selection actions are need because no more data items are found.

In the example of FIG. 4A, the data items returned to the diagram generator 320 as query results are represented as nodes connected by edges that correspond to how they are related in the data management system 340. For example, the edges can represent a primary key/foreign key relationship between the corresponding data items. The edges can represent any of a variety of relationships as described, for example, in U.S. application Ser. No. 10/979,742 mentioned above.

Figure 5:
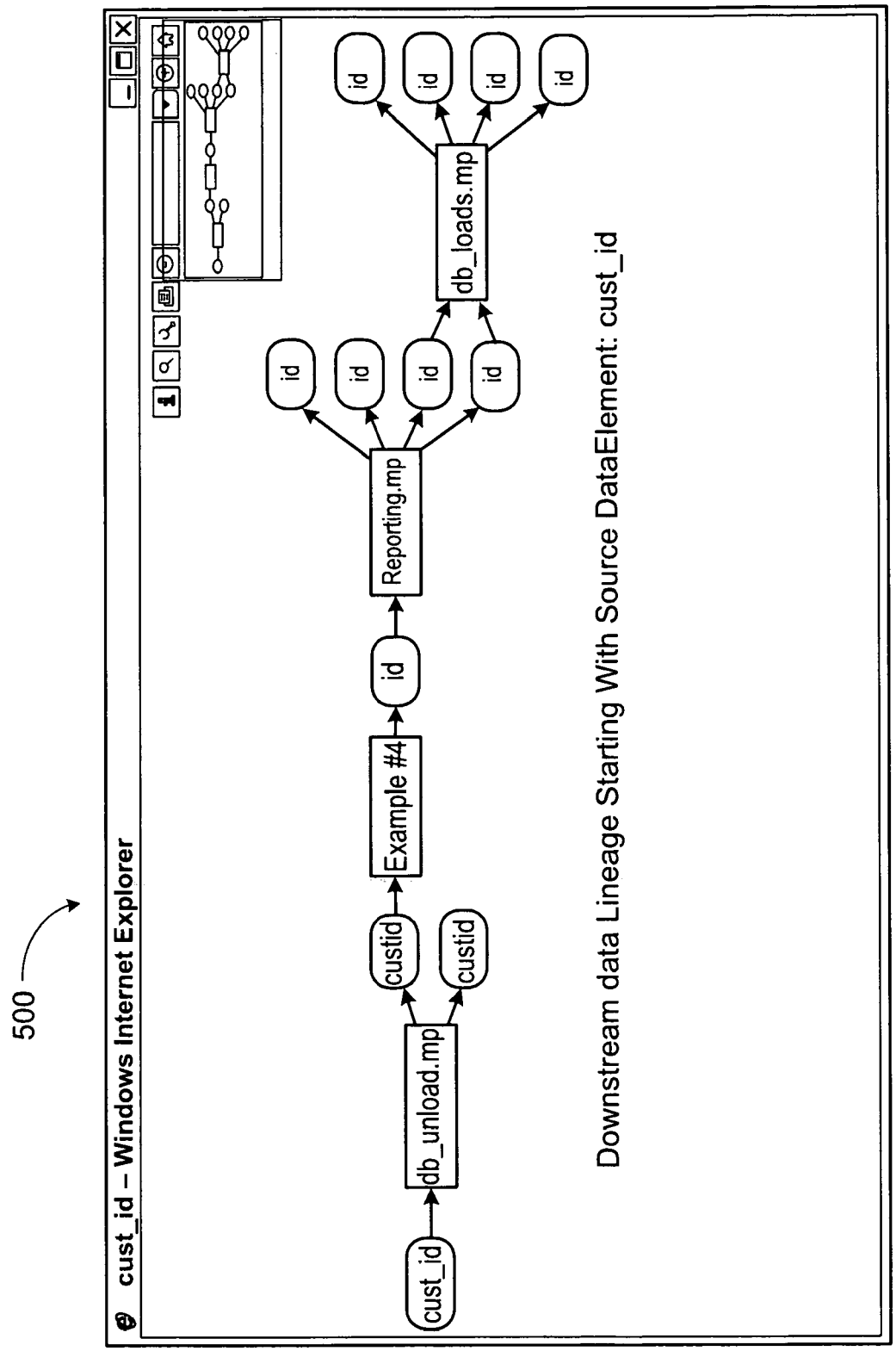
FIG. 5 shows an exemplary data relationship diagram.

FIG. 5 is an example of a data relationship diagram that is generated by the diagram generator 320 based on the retrieved data items presented in a window 500 of the user interface 300. Rectangles and rounded rectangles in FIG. 5 are nodes that represent data items. Connections between nodes are directed edges that represent relationships between the nodes. The direction of the arrow indicates that the downstream data item represents an entity that is affected by the entity represented by the upstream data item. For example, in the diagram shown in FIG. 5 the nodes correspond to metadata representing fields in various datasets and graphs that process the data in those datasets. Rounded rectangles represent data items of type "field." Rectangles represent data items of type "graph" which are applications that act on input associated with the data items positioned to the immediate left and provide output associated with the data items positioned to the immediate right. For example, a component in a graph may access data in a first field (whose metadata is stored in a first data item), and may output data in a second field (whose metadata is stored in a second data item).

The first data item 510, the field cust_id, is the starting data item selected by the user for data relationship diagram generation. The diagram of FIG. 5 presents a picture of how the field cust_id, 510, has been used, i.e., a downstream data lineage diagram. The application db_unload.mp reads in and processes data from the field cust_id, then outputs data in the two fields custid. The application Example #4 then reads in and processes data from one of the two fields, and outputs data in field id. The field id then is read by the application reporting.mp which outputs data in four fields. Finally, the application db_load.mp reads in two of the four fields resulted from the application reporting.mp and writes four more fields.

The data relationship diagram of FIG. 5 is what is presented to a user when he clicks on the data item cust_id displayed in the metadata browser, an example of which is shown in FIG. 2. An exemplary process, from when the user clicks on the data item on which he is interested in finding data relationship information to when the diagram is presented, is illustrated in the flowchart shown in FIG. 6.

Figure 6:
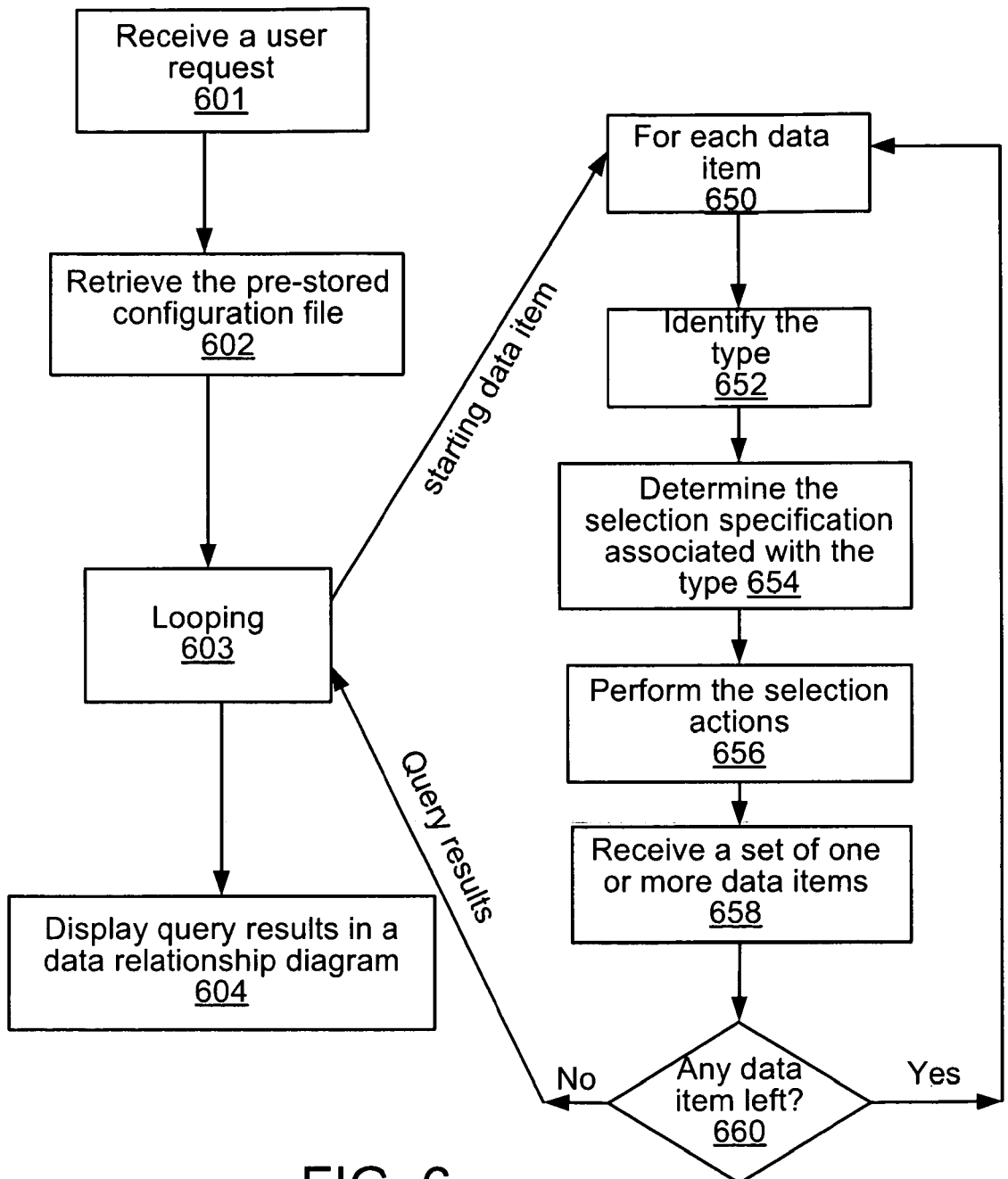
FIG. 6 is a flowchart of a process for generating data relationship diagrams.

FIG. 6 shows a dynamic and user configurable process for generating a data relationship diagram. A user initiates the process by selecting (e.g., clicking on) the data item he is interested in and specifies the configuration file to be used, for example, by clicking on the corresponding radio button (shown in FIG. 3). A user request then is sent on behalf of the user. The diagram generator 320 receives the user request in step 601. The user request identifies the starting data item, and any other information that may be needed to indicate the appropriate configuration file to be used to generate the data relationship diagram desired by the user. In step 602, the diagram generator retrieves the configuration file from the configuration file storage 360. Step 603 is a looping process. The looping process starts with a first data item, i.e., the starting data item. Each iteration of the loop includes the following steps for each data item that is returned from the previous iteration (or for the starting data item in the first iteration): step 652—identify the type of the data item, step 654—determine the selection specification associated with the type, step 656—perform the selection actions contained in the selection specification, step 658— retrieve a set of one or more data items as results of step 656, and step 660—determine whether the looping process should terminate by checking whether there is any retrieved data item that has yet to be processed.

In the example above, the looping is based on individual data items retrieved. Alternatively, a nested looping process can be constructed with first level looping based on steps (e.g., edges in an entity-relationship diagram) away from the first data item, and second level looping based on data items contained in the set of one or more data items retrieved in each first level loop iteration.

When there are no more data items to be retrieved (according to the selection actions in the selection specifications defined by the configuration file), the looping process terminates and the collection of data items and their inter-relationships obtained during the looping process are processed in step 604 and a data relationship diagram is generated based on the processing of the returned query results. All data items retrieved in the looping process are returned and rendered on a data relationship diagram. Alternatively, the diagram generator 320 may render the data relationship diagram as the looping process is being performed, eliminating the need for some or all of the processing performed in step 604.

One example of a query language in which the selection actions may be formulated is described in U.S. application Ser. No. 10/979,742, which discloses a method for managing and analyzing data stored in a data system. In that application, selection actions, including navigation actions and expression actions, for retrieval of desired data from a data store are described. Among the navigation actions, the following four types are defined, walk, inv_walk, gather_all, find_ultimate.

The action walk takes two parameters, an annotation rule and a category. The action walk returns the data items in the specified category that are referenced by the specified annotation rule. In some implementations, data items correspond to objects that are related according to a defined schema and the type of a data item is determined by its category in the defined schema.

The action inv_walk takes two parameters as well, an annotation rule and a category. The action inv_walk returns the data items in the specified category cat that have an annotation rule that references the data item upon which an action inv_walk is invoked.

The action gather_all takes as a parameter a series of one or more navigation actions. It performs the navigation action(s) recursively and returns all the data objects found at each step of the recursion.

The action find_ultimate also takes as a parameter a series of one or more navigation actions. It performs the navigation action(s) recursively and returns all the "leaf node" data objects found at the end of the recursion.

With the above four actions, a user can compose a series of navigation actions to navigate data objects stored in a database. The composition of navigation actions may be stored as a selection specification in a configuration file.

The user can also incorporate expression actions into selection specifications. Expression actions operate on a set of one or more data items. For example, the expression action sort(expr) sorts the set of one or more data items by expr. Expression action filter(expr) filters the set of one or more data items by expr. Expression action eval(expr) evaluates expr on the set of one or more data items.

For a given type of starting data item, the configuration file uses a selection specification with one or more selection actions (such as the navigation and expression actions described above) to identify a set of one or more objects related to that starting data item. The configuration file can also include a label specification along with the selection specification for a given type of data item. The label specification is used to construct a label for the node in the data relationship diagram representing the starting item.

FIGS. 7A, 7B, and 7C show three examples of configuration files with selection specifications composed of navigation and expression actions as the selection actions.

FIG. 7A shows an example of a configuration file with three selection specifications defined for three types of data items, 'Subject Area', 'Logical Entity', and 'Entity Relationship'. For a data item that is of type 'Subject Area', the corresponding selection specification, designated as sel_spec, includes a navigation action, inv_walk("SubjectAreaOID", "Logical Entity"), which returns a set of one or more data items that belong to category Logical Entity and have an annotation rule SubjectAreaOID that references the set of one or more data items on which this selection specification is imposed. For a data item that is of type 'Logical Entity', the selection specification, designated as sel_spec, includes a composition of four actions, a navigation action inv_walk, followed by an expression action filter, followed by two navigation actions walk. For a data item that is of type 'Entity Relationship', the corresponding selection specification, designated as sel_spec, includes a navigation action walk. A label specification, designated as label_spec, includes an expression action eval. The returned value of this expression action is used for labeling the node that represents the data item in the data relationship diagram being generated. In this example, the value obtained from expression action eval is used as a node label of data items that are of type 'Entity Relationship'.

FIG. 7B shows a portion of a configuration file with a selection specification defined for a 'system' type of data item. In this example, there are two different selection specifications defined for the same type of data item, which enables the diagram generator 320 to use different selection actions for the upstream and downstream directions of the data relationship diagram. Therefore, in the final data relationship diagram, the starting data item will be positioned somewhere in the middle, instead of either end. In the downstream section, designated as # Downstream, the data item type 'system' corresponds to a selection specification with a composition of two inv_walk navigation actions and two walk navigations. In the upstream section, designated as # Upstream, the data item type 'system' also corresponds to a selection specification with a composition of two inv_walk navigation actions and two walk navigations, but the annotation rule indicating whether a given dataset is being read or written is swapped compared to the downstream direction.

The configuration file can also include a label specification to define a node label, and a label specifications to define a label for the edge from the node from which navigation actions originate. A label based on the type of the nodes at either end of the edge can be used for edge labeling. Alternatively an edge label may be customized by a user through a value assigned to variable in the configuration file.

In some implementations, a selection specification can include a set of multiple selection actions to enable the diagram generator 320 to execute multiple queries at a time, rather than one query at a time, and allows a sequence of sets of nodes, rather than a single set of node, to be returned. This feature can be helpful for accurate rendering of the diagram when there are certain kinds of dependency among the nodes.

Even though the exemplary selection specifications discussed above are written in one particular language, it should be understood that the methodology disclosed here is equally applicable to other languages used for navigating or tracing data stored in a data storage.

So far, the data relationship diagram generation process described above is user configurable in the sense that a user can configure how he desires certain selection actions to be carried out by defining selection specifications in a configuration file.

A user can further configure a data relationship diagram generation process by controlling the looping process depicted in FIG. 6. The looping process can continue with as many iterations are needed, until no additional data items are returned in any query results. Alternatively, a user can limit the number of iterations of the looping process by imposing an exit condition such as n≤n_max, with n as the number of first level iterations executed in the nested looping scheme mentioned above so that n_max is the maximum number of edges along a path away from the node representing the selected starting data item. A user could also directly control how many nodes and edges to display on the final diagram in the diagram rendering process.

In some implementations, a user can move back and forth between data relationship diagrams and a user interface for data browsing. For example, in a data browsing interface, a user can select a first data item and request a data relationship diagram for that data item. In the data relationship diagram, a user can select a node that is different from the node associated with the first data item, to redirect the user interface to the data browsing interface for corresponding data item.

Figure 8:
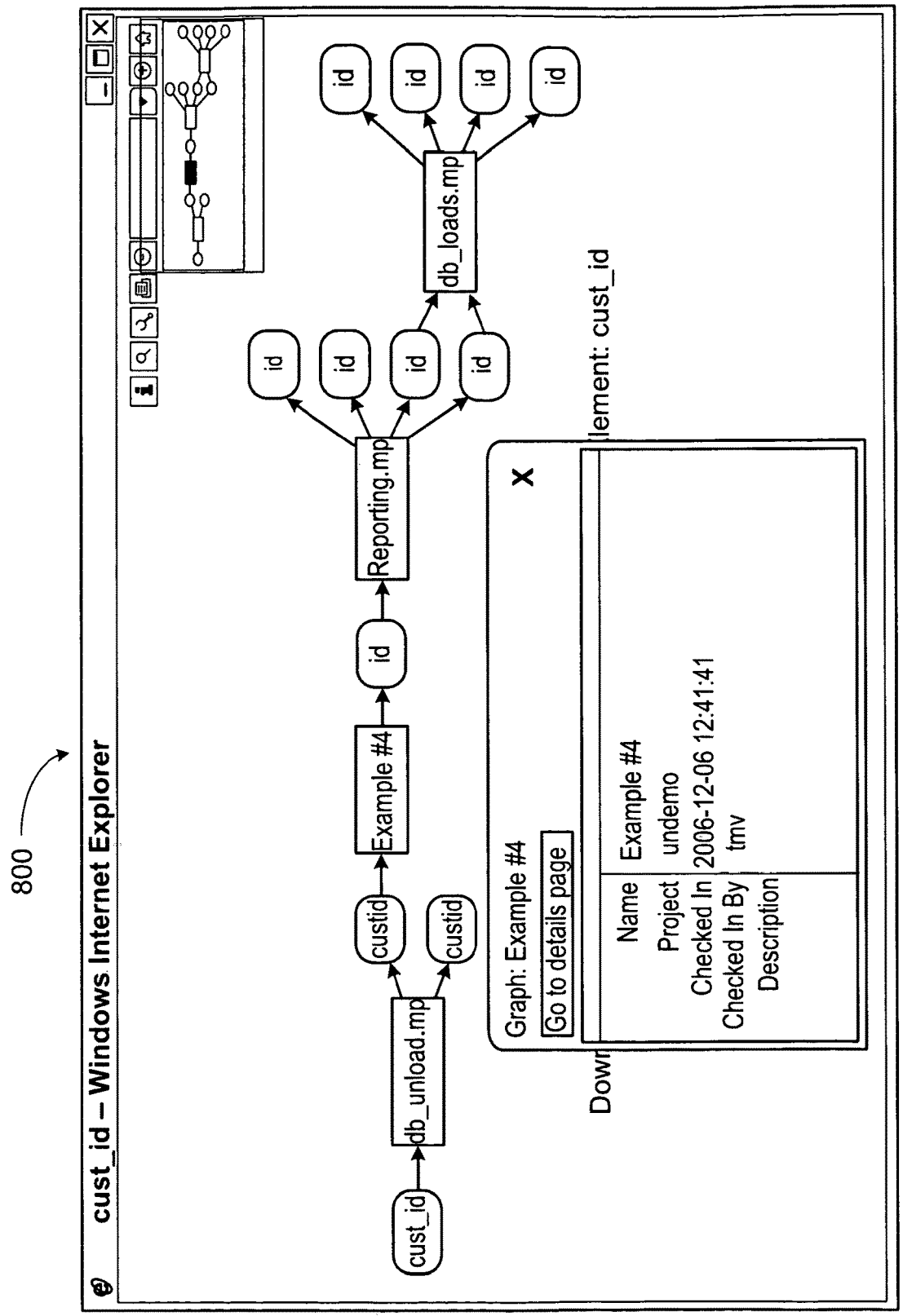
FIG. 8 shows an exemplary interface for displaying detailed information for a node of a data relationship diagram.

In some implementations, a user can select a node in a data relationship graph for detailed information, which may be displayed in a pop-up window, for example, as in the window 800 shown in FIG. 8.

The techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for presenting a data lineage diagram indicating relationships among metadata items stored in a metadata management system accessible to a computing system, the method including:

receiving a request that identifies a first metadata item, stored in the metadata management system, from a user interface, the first metadata item including metadata describing first stored data that corresponds to at least a portion of a dataset or an executable program and is stored in a first data source different from the metadata management system;

providing a plurality of selection specifications for executing queries from the computing system to select metadata items in the metadata management system that are related to a given metadata item;

querying the metadata management system using one or more of the plurality of selection specifications to identify a set of one or more metadata items that are related to the first metadata item, where to a first selection specification from the plurality of selection specifications is associated with the first metadata item;

for each of multiple returned metadata items in the identified set, querying the metadata management system to identify additional metadata items according to a selection specification from the plurality of selection specifications that is associated with the returned metadata item, including performing multiple iterations of queries, where each iteration includes identifying another set of one or more metadata items each related to at least one metadata item of a previous set of one or more metadata items from a previous iteration; and generating a data lineage diagram indicating data lineage relationships among programs and data represented by the metadata items identified using the querying, where the data lineage diagram includes nodes that correspond to the programs and data represented by the metadata items and edges that represent the data lineage relationships among the programs and data represented by the metadata items, and the edges include:

an edge representing a data lineage relationship between a node representing stored data that corresponds to at least a portion of a dataset or an executable program stored in the first data source and a node representing stored data that corresponds to at least a portion of a dataset or an executable program stored in a second data source different from the first data source and the metadata management system; and at least one of:

an edge representing a downstream data lineage relationship between the node representing the first stored data and a node representing stored data that corresponds to at least a portion of a dataset or an executable program affected by the first stored data; or an edge representing an upstream data lineage relationship between the node representing the first stored data and a node representing stored data that corresponds to at least a portion of a dataset or an executable program from which the first stored data is derived.

2. The method of claim 1, wherein querying the metadata management system to identify the set of one or more metadata items that are related to the first metadata item includes dynamically formulating a query using the first selection specification in response to the request, processing the query by the metadata management system, and receiving a query result from the metadata management system identifying the set of one or more metadata items.

3. The method of claim 2, wherein the query includes at least one navigation action that navigates the metadata management system to retrieve metadata items that are referenced by an attribute of the first metadata item.

4. The method of claim 2, wherein the query includes at least one navigation action that navigates the metadata management system to retrieve metadata items that have an attribute referencing the first metadata item.

5. The method of claim 2, wherein processing the query by the metadata management system includes navigating the metadata management system recursively and returning at least some metadata items found at each of multiple steps of the recursion.

6. The method of claim 1, further including receiving from the user interface a selection of a configuration file including the plurality of selection specifications from multiple stored configuration files.

7. The method of claim 1, further including providing a label specification associated with the first metadata item for constructing a label for a node of the generated data lineage diagram representing the first metadata item.

8. The method of claim 1, further including providing a label specification associated with the first metadata item for constructing a label for an edge of the generated data lineage diagram representing a relationship between the first metadata item and another metadata item.

9. The method of claim 1, wherein each of two or more selection specifications of the plurality of selection specifications is associated with a different predetermined type, and each predetermined type corresponds to a different portion of a dataflow graph processing system.

10. The method of claim 9, wherein at least one predetermined type corresponds to a metadata item representing a portion of a dataflow graph that includes nodes representing processing components and links representing flows of data between the processing components.

11. The method of claim 9, wherein at least one predetermined type corresponds to a metadata item representing a field in a dataset.

12. A computing system for presenting a data lineage diagram indicating relationships among metadata items stored in a metadata management system, the computing system including:

a metadata management system storing metadata items;

a user interface including an input interface configured to receive a request that identifies a first metadata item, stored in the metadata management system, the first metadata item including metadata describing first stored data that corresponds to at least a portion of a dataset or an executable program and is stored in a first data source different from the metadata management system;

a storage system providing a plurality of selection specifications for executing queries from the computing system to select metadata items in the metadata management system that are related to a given metadata item;

a metadata management system interface configured to query the metadata management system using one or more of the plurality of selection specifications to identify a set of one or more metadata items that are related to the first metadata item, where a first selection specification from the plurality of selection specifications is associated with the first metadata item, and for each of multiple returned metadata items in the identified set, query the metadata management system to identify additional metadata items according to a selection specification from the plurality of selection specifications that is associated with the returned metadata item, including performing multiple iterations of queries, where each iteration includes identifying another set of one or more metadata items each related to at least one metadata item of a previous set of one or more metadata items from a previous iteration; and one or more processors configured to execute a diagram generator to generate a data lineage diagram indicating data lineage relationships among programs and data represented by the metadata items identified using the querying, where the data lineage diagram includes nodes that correspond to the programs and data represented by the metadata items and edges that represent the data lineage relationships among the programs and data represented by the metadata items, and the edges include:

an edge representing a data lineage relationship between a node representing stored data that corresponds to at least a portion of a dataset or an executable program stored in the first data source and a node representing stored data that corresponds to at least a portion of a dataset or an executable program stored in a second data source different from the first data source and the metadata management system; and at least one of:

an edge representing a downstream data lineage relationship between the node representing the first stored data and a node representing stored data that corresponds to at least a portion of a dataset or an executable program affected by the first stored data; or an edge representing an upstream data lineage relationship between the node representing the first stored data and a node representing stored data that corresponds to at least a portion of a dataset or an executable program from which the first stored data is derived.

13. The computing system of claim 12, wherein querying the metadata management system to identify the set of one or more metadata items that are related to the first metadata item includes dynamically formulating a query using the first selection specification in response to the request, processing the query by the metadata management system, and receiving a query result from the metadata management system identifying the set of one or more metadata items.

14. The computing system of claim 13, wherein the query includes at least one navigation action that navigates the metadata management system to retrieve metadata items that are referenced by an attribute of the first metadata item.

15. The computing system of claim 13, wherein the query includes at least one navigation action that navigates the metadata management system to retrieve metadata items that have an attribute referencing the first metadata item.

16. The computing system of claim 13, wherein processing the query by the metadata management system includes navigating the metadata management system recursively and returning at least some metadata items found at each of multiple steps of the recursion.

17. The computing system of claim 12, wherein the user interface is configured to provide a selection of a configuration file including the plurality of selection specifications from multiple stored configuration files.

18. The computing system of claim 12, wherein the storage system is configured to provide a label specification associated with the first metadata item for constructing a label for a node of the generated data lineage diagram representing the first metadata item.

19. The computing system of claim 12, wherein the storage system is configured to provide a label specification associated with the first metadata item for constructing a label for an edge of the generated data lineage diagram representing a relationship between the first metadata item and another metadata item.

20. The computing system of claim 12, wherein each of two or more selection specifications of the plurality of selection specifications is associated with a different predetermined type, and each predetermined type corresponds to a different portion of a dataflow graph processing system.

21. The computing system of claim 20, wherein at least one predetermined type corresponds to a metadata item representing a portion of a dataflow graph that includes nodes representing processing components and links representing flows of data between the processing components.

22. The computing system of claim 20, wherein at least one predetermined type corresponds to a metadata item representing a field in a dataset.

23. A computing system for presenting a data lineage diagram indicating relationships among metadata items stored in a metadata management system, the computing system including:

means for receiving a request that identifies a first metadata item, stored in the metadata management system, from a user interface, the first metadata item including metadata describing first stored data that corresponds to at least a portion of a dataset or an executable program and is stored in a first data source different from the metadata management system;

means for providing a plurality of selection specifications for selecting executing queries from the computing system to select metadata items in the metadata management system that are related to a given metadata item;

means for querying the metadata management system using one or more of the plurality of selection specifications to identify a set of one or more metadata items that are related to the first metadata item, where a first selection specification from the plurality of selection specifications is associated with the first metadata item, and querying the metadata management system, for each of multiple returned metadata items in the identified set, to identify additional metadata items are identified according to a selection specification from the plurality of selection specifications that is associated with the returned metadata item, including performing multiple iterations of queries, where each iteration includes identifying another set of one or more metadata items each related to at least one metadata item of a previous set of one or more metadata items from a previous iteration; and means for generating a data lineage diagram indicating data lineage relationships among programs and data represented by the metadata items identified using the querying, where the data lineage diagram includes nodes that correspond to the programs and data represented by the metadata items and edges that represent the data lineage relationships among the programs and data represented by the metadata items, and the edges include:

an edge representing a data lineage relationship between a node representing stored that corresponds to at least a portion of a dataset or an executable program stored in the first data source data and a node representing stored data that corresponds to at least a portion of a dataset or an executable program stored in a second data source different from the first data source and the metadata management system; and at least one of:

an edge representing a downstream data lineage relationship between the node representing the first stored data and a node representing stored data that corresponds to at least a portion of a dataset or an executable program affected by the first stored data; or an edge representing an upstream data lineage relationship between the node representing the first stored data and a node representing stored data that corresponds to at least a portion of a dataset or an executable program from which the first stored data is derived.

24. A computer-readable medium storing a computer program for presenting a data lineage diagram indicating relationships among metadata items stored in a metadata management system, the computer program including instructions for causing a computing system to:
  receive a request that identifies a first metadata item, stored in the metadata management system, from a user interface, the first metadata item including metadata describing first stored data that corresponds to at least a portion of a dataset or an executable program and is stored in a first data source different from the metadata management system;
  provide a plurality of selection specifications for executing queries from the computing system to select metadata items in the metadata management system that are related to a given metadata item;
  query the metadata management system using one or more of the plurality of selection specifications to identify a set of one or more metadata items that are related to the first metadata item, where a first selection specification from the plurality of selection specifications is associated with the first metadata item;
  for each of multiple returned metadata items in the identified set, querying the metadata management system to identify additional metadata items according to a selection specification from the plurality of selection specifications that is associated with the returned metadata item, including performing multiple iterations of queries, where each iteration includes identifying another set of one or more metadata items each related to at least one metadata item of a previous set of one or more metadata items from a previous iteration; and
  generate a data lineage diagram indicating data lineage relationships among programs and data represented by the metadata items identified using the querying, where the data lineage diagram includes nodes that correspond to the programs and data represented by the metadata items and edges that represent the data lineage relationships among the programs and data represented by the metadata items, and the edges include:
    an edge representing a data lineage relationship between a node representing stored data that corresponds to at least a portion of a dataset or an executable program stored in the first data source and a node representing stored data that corresponds to at least a portion of a dataset or an executable program stored in a second data source different from the first data source and the metadata management system; and at least one of:
    an edge representing a downstream data lineage relationship between the node representing the first stored data and a node representing stored data that corresponds to at least a portion of a dataset or an executable program affected by the first stored data; or
    an edge representing an upstream data lineage relationship between the node representing the first stored data and a node representing stored data that corresponds to at least a portion of a dataset or an executable program from which the first stored data is derived.

25. The computer-readable medium of claim 24, wherein querying the metadata management system to identify the set of one or more metadata items that are related to the first metadata item includes dynamically formulating a query using the first selection specification in response to the request, processing the query by the metadata management system, and receiving a query result from the metadata management system identifying the set of one or more metadata items.

26. The computer-readable medium of claim 25, wherein the query includes at least one navigation action that navigates the metadata management system to retrieve metadata items that are referenced by an attribute of the first metadata item.

27. The computer-readable medium of claim 25, wherein the query includes at least one navigation action that navigates the metadata management system to retrieve metadata items that have an attribute referencing the first metadata item.

28. The computer-readable medium of claim 25, wherein processing the query by the metadata management system includes navigating the metadata management system recursively and returning at least some metadata items found at each of multiple steps of the recursion.

29. The computer-readable medium of claim 24, further including instructions for causing the computing system to receive from the user interface a selection of a configuration file including the plurality of selection specifications from multiple stored configuration files.

30. The computer-readable medium of claim 24, further including instructions for causing the computing system to provide a label specification associated with the first metadata item for constructing a label for a node of the generated data lineage diagram representing the first metadata item.

31. The computer-readable medium of claim 24, further including instructions for causing the computing system to provide a label specification associated with the first metadata item for constructing a label for an edge of the generated data lineage diagram representing a relationship between the first metadata item and another metadata item.

32. The computer-readable medium of claim 24, wherein each of two or more selection specifications of the plurality of selection specifications is associated with a different predetermined type, and each predetermined type corresponds to a different portion of a dataflow graph processing system.

33. The computer-readable medium of claim 32, wherein at least one predetermined type corresponds to a metadata item representing a portion of a dataflow graph that includes nodes representing processing components and links representing flows of data between the processing components.

34. The computer-readable medium of claim 32, wherein at least one predetermined type corresponds to a metadata item representing a field in a dataset.

* * * * *